(12) United States Patent
Aho et al.

(10) Patent No.: US 6,198,941 B1
(45) Date of Patent: Mar. 6, 2001

(54) METHOD OF OPERATING A PORTABLE COMMUNICATION DEVICE

(75) Inventors: Alfred Vaino Aho, Chatham; Richard Dennis Gitlin, Little Silver; Ramachandran Ramjee, Matawan; Thomas Yat Chung Woo, Red Bank, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/130,979

(22) Filed: Aug. 7, 1998

(51) Int. Cl.[7] ...................................................... H04B 1/38
(52) U.S. Cl. .......................... 455/552; 455/67.1; 455/426
(58) Field of Search .................................... 395/832, 681, 395/683; 455/403, 552, 553, 90, 426, 67.1

(56) References Cited

U.S. PATENT DOCUMENTS 5,497,339 * 3/1996 Barnard ............................ 364/705.05
5,960,214 * 9/1999 Sharpe, Jr. et al. ................. 395/835
6,006,105 * 12/1999 Rostoker et al. .................... 455/552

OTHER PUBLICATIONS

T–W Chen, P. Krzyzanowski, M. R. Lyu, C. Screenan and J. A. Trotter, Proceedings of the 27th PTCS Symposium, Seattle, WA, Jun. 1997, "Renegotiable Quality of Service—A New Scheme for Fault Tolerance in Wireless Networks," IEEE, pp. 21–30.

* cited by examiner

Primary Examiner—Lee Nguyen
(74) Attorney, Agent, or Firm—Barry H. Freedman

(57) ABSTRACT

A method of effectuating a change in the operation of a portable communication device such as a laptop or palmtop computer, a personal digital assistant (PDA), or a cellular telephone. The device can communicate with a remote host or server using one of two or more different communication arrangements. Various signals indicative of the environment in which the device is operating are monitored, to anticipate or predict a change or transition from one communication arrangement to the other. If the change is determined to be both imminent and significant, the operation change is effected substantially simultaneously, by changing parameters in the transport and/or application protocol layer in the device.

19 Claims, 4 Drawing Sheets

METHOD OF OPERATING A PORTABLE COMMUNICATION DEVICE

FIELD OF THE INVENTION

This invention relates generally to a method of operating a portable communication device such as a laptop or palmtop computer, a personal digital assistant (PDA), or a cellular telephone (or the like), and more particularly, to a method of effectuating a change in the operation of the device (implemented in changes in parameters in the transport and/or application protocol layer in the device), in accordance with anticipated or predicted changes in the communications arrangement (i.e., changes in the network or link level protocol parameters) that the device is using.

BACKGROUND OF THE INVENTION

Modern portable telecommunication devices, such as laptop or palmtop computers, personal digital assistants (PDA's), or cellular telephones, are now capable of operating using more than one different communications arrangement, depending upon various external factors. For example, a handheld digital terminal may transmit data to, and receive data from a remote server or host via a wireless local area network (e.g., Wavelan) when the device is indoors. When the device is later moved to an outdoor location, the device may then be arranged to communicate via a cellular (e.g., GSM) network. In the aforementioned example, when the device is moved outdoors, it may transition from a high-bandwidth environment to a low-bandwidth environment, and various other of its communications properties (e.g. bit error rate, delay, jitter, loss, etc.) may also change. These changes typically are evidenced by network or link level protocol signals in the processor that controls the operation of the device.

In prior art portable devices, when an abrupt change or discontinuity, such as a bandwidth reduction, occurs in the communications arrangement, the performance of the device degrades, causing, for example, graphical images to become fuzzy or received signals to become noisy or distorted. In some existing arrangements, this degradation is then sensed, and steps are taken to correct to problem, such as by intentionally permitting a reduction in the precision of the received and/or transmitted signals, decreasing the resolution of the display or reducing the size of the image. Such an approach is reactive, in that the change in the communication arrangement occurs first, and the change in the operation of the portable device occurs later, in response to the detection of the fact that performance has become degraded. In a reactive approach, data can be lost, since the transition itself may take a not insignificant amount of time, and during that time, the device operation is sub-optimum and the quality of service, as perceived by the user, will be degraded.

One example of a previous reactive approach is described generally in a paper entitled "Renegotiable Quality of Service—A New Scheme for Fault Tolerance in Wireless Networks, presented by R-W Chen, P. Krzyzanowski, M. Lyu, C. Sreenan and J. Trotter (all of Lucent Technologies) at the 27$^{th}$ PTCS, June 1997, Seattle, Wash. This reference relates to a device in which the link layer protocol is arranged to determine that the bandwidth available to the device has changed. The link layer protocol can then signal this change to upper layers of the protocol stack, including, the application layer protocol, responsive to which the application may, for example, change its data rate.

Other reactive approaches have been used in modems, in Internet applications, and in images processed in accordance with MPEG standards. In connection with certain "intelligent" modems, the bit rate at which a modem operates can be changed reactively, in response to channel conditions that are inferred, for example, from a measurement of error rate or constellation dispersion. In connection with the Internet, it is also known in a general way that the TCP/IP protocol stack can be arranged to adapt, over time, to the fact that the available bandwidth available to an Internet device has changed. This adaptation can be used to thereafter cause the application to change its rate, or to at least cause the application's data to be buffered, so that data is not lost in the network due to inadequate bandwidth. With respect to image processing, the MPEG standard contemplates an application protocol layer that can be structured in such a way as to be able to provide outputs at different bit rates, based on being told what bandwidth is available.

In each of the reactive approaches described above, changes occurring in the communications arrangement that a device is using are first observed. Then, changes to the operation of the device itself are brought about by changes in the applications layer protocol. This reactive process takes time, during which data may be lost and/or performance may suffer. Thus, the problem in the prior art is the inability to provide a speedy transition so as to minimize or eliminate data loss or to at least provide a transition that is as unobjectionable as possible, even in the face of some data loss during the transition.

SUMMARY OF THE INVENTION

In accordance with the present invention, a portable communication device can communicate with a remote host or server using one of two or more different communication arrangements. A change in the communications arrangement used by the portable communication device is anticipated or predicted, by monitoring various signals indicative of the environment in which the device is operating. If the change is determined to be both imminent and significant, the operation of the portable device is altered, typically by adjusting parameters in the application or transport layer protocol. Thus, changes in the operation of the device occur virtually simultaneously with changes in the communications arrangement.

In one embodiment of the invention, a signal or flag is generated in response to significant changes in signal strength occurring in the communications arrangements with which the device can be used. The flag is then used to explicitly signal or announce the change to one or more applications running on the device, and/or to the communications transport protocol layer. Where the characteristics of one or more applications are to be changed, the application protocol layer is involved. For example, the changes may affect the characteristics by which an image is displayed on a display screen that is part of the device, such as by changing the window size, the resolution, frame rate, or other characteristics of the pictorial image. Where the transport protocol layer is involved, changes may affect the size of the packets with which information is conveyed, or the characteristics by which information is buffered or stored. In either event, by virtue of the present invention, when there is a transition in the communication arrangement used by the device, there is also an almost simultaneous change in the operation of the device itself.

As an example, in a laptop computer communicating with a remote host via a wireless communications link, if the laptop is being moved from one location to another, a falling signal strength is detected in a first communications arrangement (e.g., a Wavelan communications arrangement used indoors) at the same time that an increasing signal strength is detected in a second communications arrangement (e.g. a GSM network used outdoors). This indicates that there is a strong likelihood that a change in the communication channel between the laptop and a remote host or server is imminent. Because this change may lead to a corresponding transition from a high bandwidth (e.g., 10 Mbps) to a low bandwidth transmission channel (e.g., 10 Kbps), the present invention causes an almost simultaneous change in the data rate of the display driver running on the laptop computer, so that the display resolution is reduced to accommodate the reduced bandwidth without any data loss.

In another embodiment of the invention, the fact that a change in the communications arrangement may be in the offing is anticipated or predicted, based upon observed operational changes in other communication characteristics, such as jitter, noise, distortion and the like. If a significant change in one or more of these characteristics is determined to be occurring in a given time interval, this is taken to be an advance warning that the application protocol layer should begin to throttle back even before the change in communications arrangement actually occurs. If the portable device is arranged to have access to geographic positioning information by virtue of a global positioning satellite (GPS) system, that information may be used as an additional indicator that the communications arrangement is likely to soon change, or as an indirect factor in determining the length of the time interval mentioned above.

BRIEF DESCRIPTION OF THE DRAWING

The present invention will be more fully appreciated by considering the following detailed description, which should be read in light of the accompanying drawing in which.

DETAILED DESCRIPTION

Figure 1:
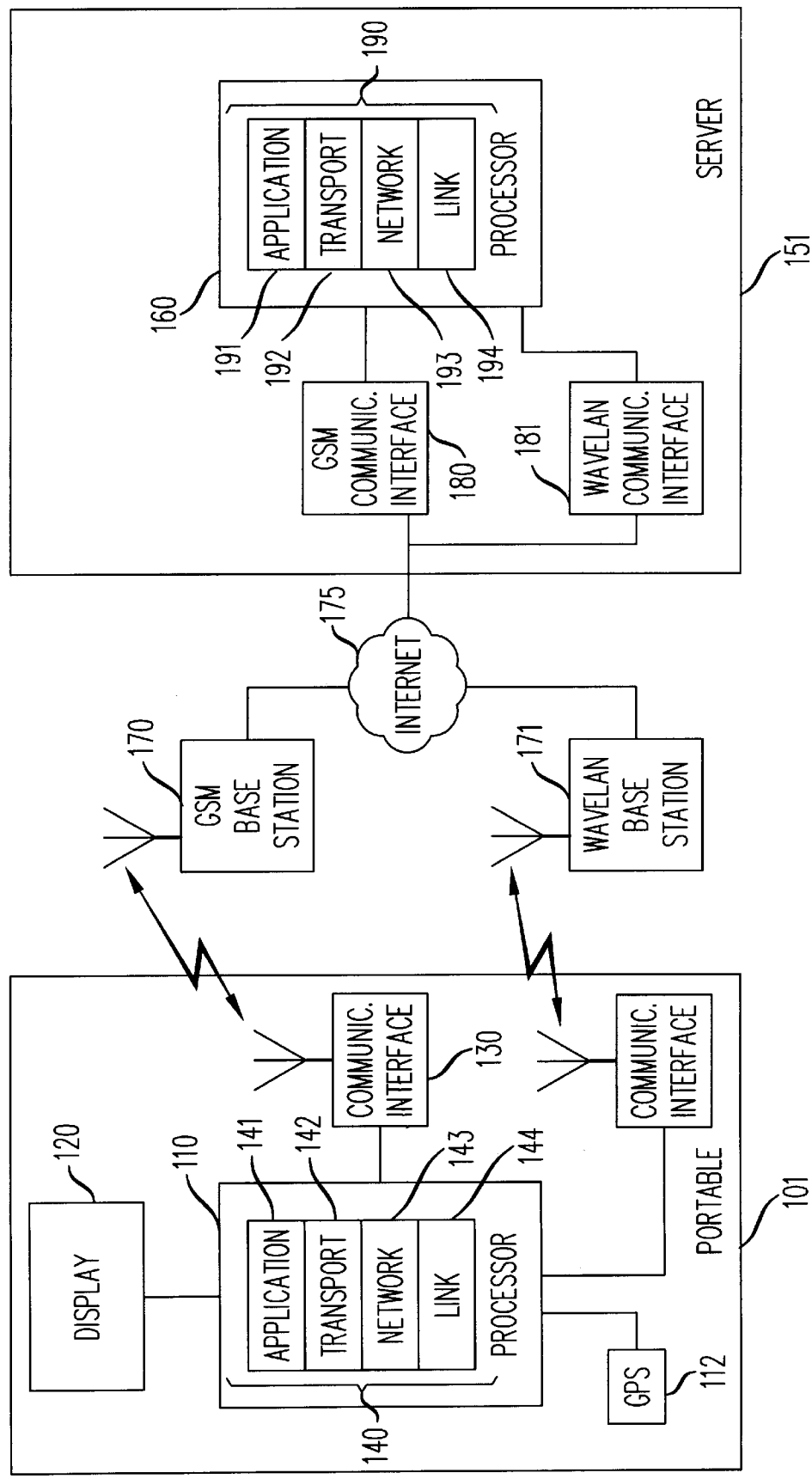
FIG. 1 is a diagram illustrating the general arrangement of a portable communication device that can communicate with a remote host or server using one of two or more different communication arrangements.

Referring first to FIG. 1, there is shown a diagram illustrating the general arrangement of a portable communication device 101 that can use the present invention when communicating with a remote server 151. As contemplated by the present invention, device 101 could be a laptop or palmtop computer, a personal digital assistant (PDA) such as the Palm Pilot III distributed by 3Com Corp., a cellular telephone with a graphical display (such as the GENIE available from Phillips Communications Corporation), or any other similar device. For the purposes of understanding and appreciating the present invention, portable device 101 includes a processor 110 that controls overall operation of the device. As is well known, processor 110 includes hardware and software elements that control the functionality of the device. Organizationally and functionally, processor 110 can be said to include a multilayer protocol stack 140, in accordance with the Open Systems Interconnection (OSI) standard promulgated by ISO. Among the layers in protocol stack are: a link layer 144, which manages data transmission over the attached communication links; a network layer 143, which provides the means for end-to-end delivery of data packets; a transport layer 142, which manages the delivery of application messages; and an application layer 141, which interfaces with and manages user-level programs. Device 101 may also include a display 120, which is arranged to exhibit pictorial information. Thus, if device 101 is a laptop or palmtop computer, display 120 could be an active matrix display panel. If device 101 is a cellular telephone, display 120 could be an LCD display screen.

Device 101 is arranged to communicate with remote locations such as server 151 via at least two different communications interfaces 130 and 131. However, at any one time, it is expected that only one communications arrangement would be in use. The first communications interface 130 might be a GSM interface, enabling communication between device 101 and a GSM base station 170. From base station 170, signals generated in device 101 are communicated to a remote server 151 via the Internet, shown generally at 175. The second communications interface 131 might be a Wavelan interface, enabling communication between device 101 and a Wavelan base station 171. From base station 171, signals generated in device 101 are also communicated to a remote server 151 via Internet 175.

Communications interfaces 130 and 131 are arranged, in accordance with the present invention, to provide information to processor 110 indicative of the strength of the communications signals received at the interfaces from the remote base stations or other devices with which device 101 communicates. This capability may be achieved using a power measurement or other signal strength measurement technique, as will be well known by persons skilled in the art.

Server 151 is controlled by a processor 160 that also includes a multilayer protocol stack 190 that is generally similar to and therefore compatible with protocol stack 140. As such, protocol stack 190 includes a link layer 194, a network layer 193, a transport layer 192, and an application layer 191. Depending upon the communication arrangement used by device 101, server 151 communicates with device 101 (as well as other devices) via either a first communications interface 180, which handles GSM traffic, or a second communications interface 181, which handles Wavelan traffic. Server 151 also communicates with many other devices, not shown.

Various internal details in portable device 101 and server 151 are not shown, since persons skilled in the art will recognize that these details are not necessary to appreciate or practice the present invention. However, it is to be understood that the logic and processes described below can be performed in suitably programmed general purpose hardware, in special purpose hardware such as ASIC's, and in a variety of other ways.

Figure 2:
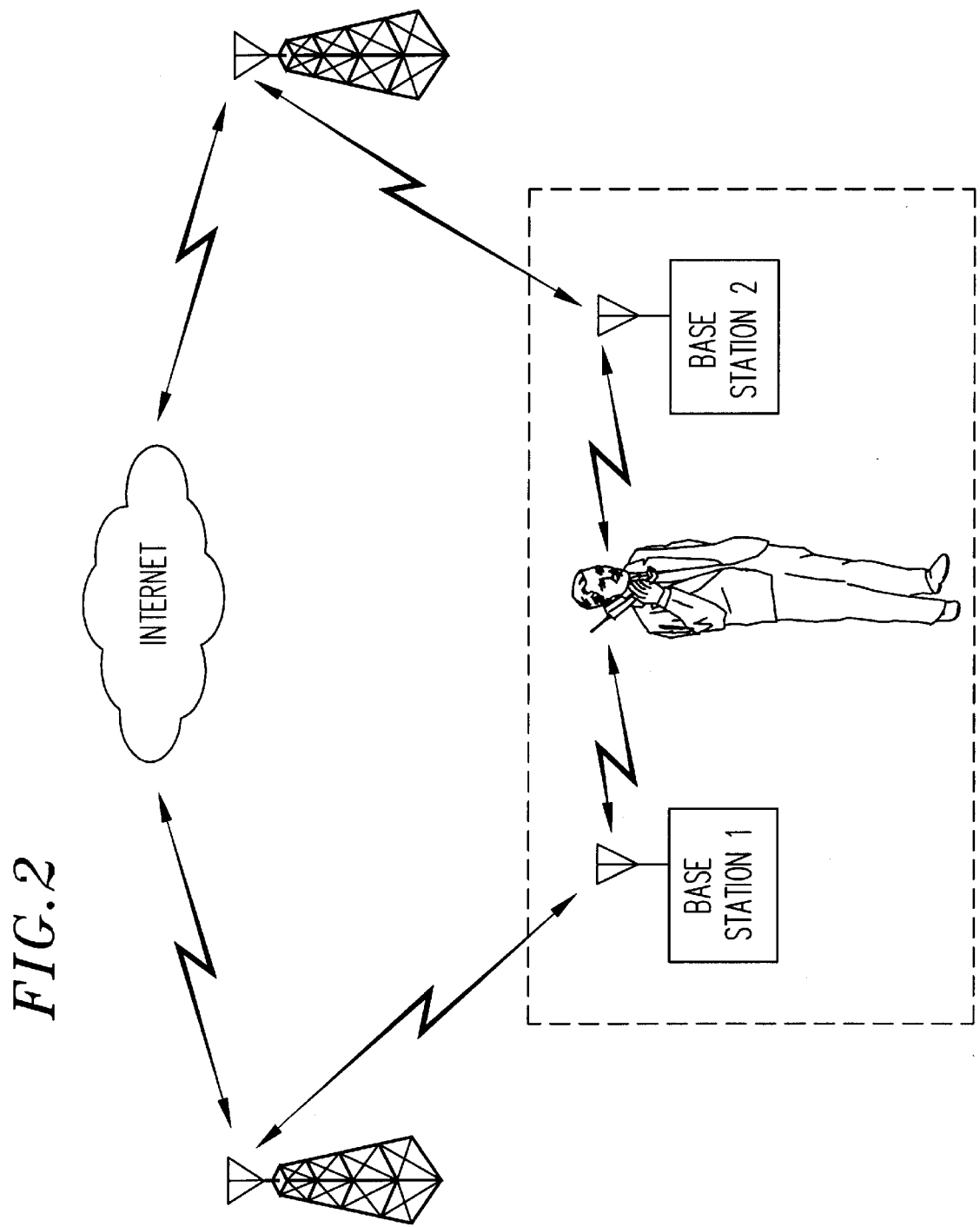
FIG. 2 illustrates how the portable communication device of FIG. 1 can be operated so that a transition may occur from one communication arrangements to a different communication arrangement.

FIG. 2 illustrates how the portable communication device of FIG. 1 can be operated so that a transition may occur from one communication arrangement to a different communication arrangement. User 201 is carrying portable laptop device 101 in a location 210. Since user 201 is indoors, signals to and from device 101 are transmitted and received via a wireless link to a Wavelan base station or concentrator 211, which in turn is connected to the Internet 175. User 201 may, however, be moving toward a door, and be about to exit to the outdoors, where communications between device 101 will transition to a second communication arrangement, this one utilizing a wireless link to a GSM base station 221, which in turn, is arranged to communicate with Internet 175. Note that while only one or the other of the communications arrangements is in use at any given time, device 101 can simultaneously receive signals from both communications arrangements. As discussed below, changes in these signals can be evaluated and constitute one approach that is useful in determining if a transition from the first communications arrangement to the second communications arrangement is likely.

Figure 3:
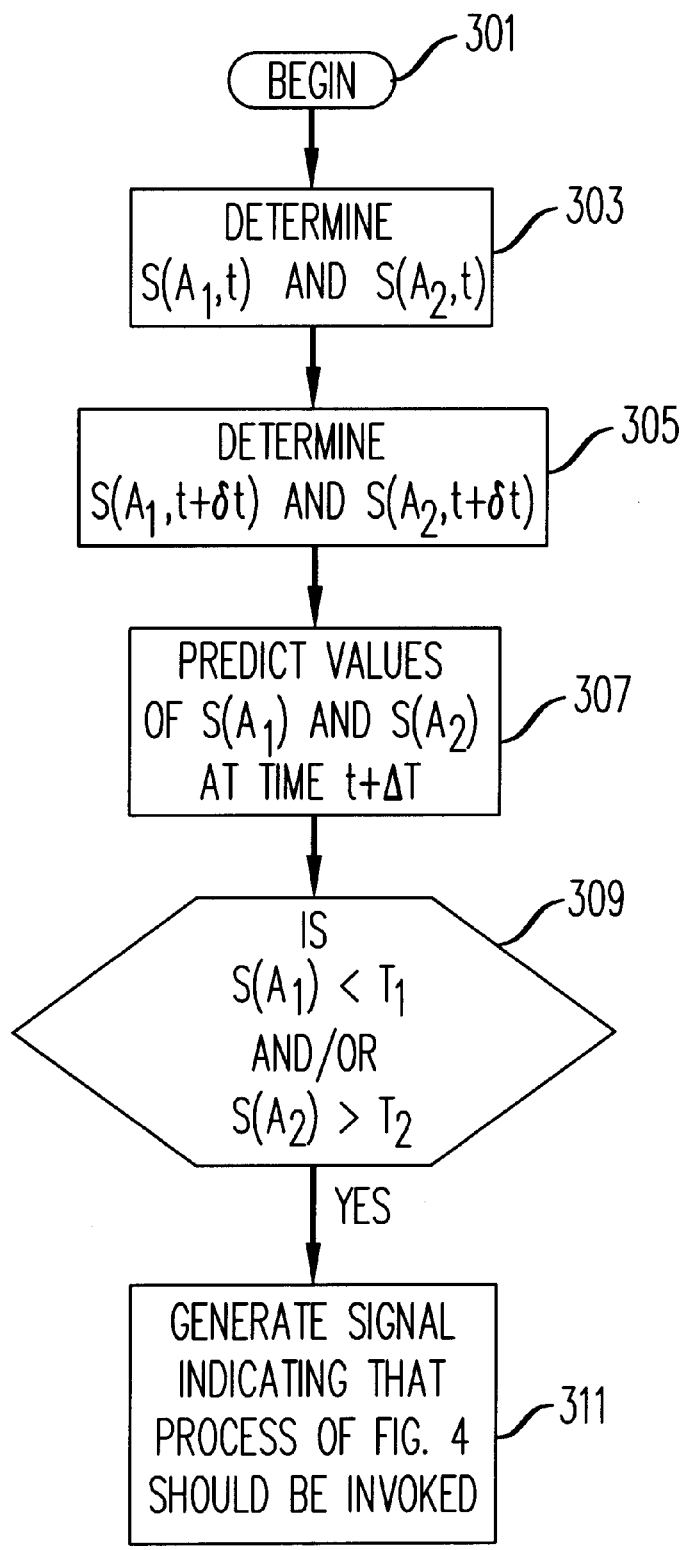
FIG. 3 is a flow diagram illustrating the steps in the process, in accordance with the present invention, by which a determination is made that a change in the communications arrangement used by the device of FIG. 1 is likely to soon occur.

Referring now to FIG. 3, there is shown a flow diagram illustrating the steps in the process, in accordance with the present invention, by which a determination is made that a change in the communications arrangement used by the device of FIG. 1 is likely to soon occur. In this process, which may occur within network layer 143 in processor 110, it is assumed that device 101 can communicate with server 151 using a first communication arrangement (a Wavelan network, for example) or a second communication arrangement (a GSM network, for example). While only one communication arrangement can be used by device 101 to communicate with server 151 at any given time, device 101 is nevertheless arranged, in accordance with the present invention, to be able to determine certain attributes about both communication arrangements, namely, the arrangement currently in use and the arrangement that may used at a future time, for example when the device 101 is moved. These attributes may include signal strength, noise level, jitter, distortion, or other similar factors that are associated with link and network protocol levels 144 and 143, respectively. Note that the bandwidth characteristics of these arrangements are quite different, since a Wavelan network has a bandwidth of approximately 10 Mbps, while a GSM network has a much (1000 times) lower bandwidth of approximately 10 Kbps.

After the process of FIG. 3 begins in step 301, a determination is made in step 303 of the values of a particular attribute of the different communication arrangements that can be used by portable device 101. Using the attribute of signal strength S at time t as an example, a determination is made in this step of the signal strength $S(A_1,t)$ measured in the device using the first communication arrangement $(A_1)$, and the signal strength $S(A_2,t)$. measured in the device using the second communication arrangement $(A_2)$. Next, in step 305, the values of signal strength are again determined, but at some later time $t+\Delta$, where $\partial t$ is a very small time interval (for example, 50 msec.). These values are given by $S(A_1, t+\partial t)$ and $S(A_2,t+\partial t)$, respectively. In step 307; an extrapolation is performed, based upon the information collected in steps 303 and 305. Specifically, the rate of change of signal strength using each of the communications arrangements over the time period $\partial t$ are determined, and this derivative is used to determine the signal strength values $S(A_1,t+\Delta T)$ and $S(A_2,t+\Delta T)$ at a future time $t+\Delta T$, where $\Delta T>\partial t$. Note here that when performing the extrapolation, linearity can be assumed, as a first order approximation.

In step 309, the signal strength values $S(A_1,t+\Delta T)$ and $S(A_2,t+\Delta T)$ are compared to respective threshholds $T_1$ and $T_2$. Assuming that the first communication arrangement is the one currently being used by device 101, and that the second communication arrangement is the one that may, in the future be used, threshhold $T_1$ represents a signal strength level below which operation of the device might be subject to difficulty. Similarly, $T_2$ represents a signal strength level above which operation of the device would normally not experience any difficulty. If a determination is made in step 309 that $S(A_1,t+\Delta T)<T_1$ and that $S(A_2,t+\Delta T)>T_2$, a signal is generated in step 311, indicating that the process of FIG. 3 should be invoked.

It is to be noted here that device 101 of FIG. 1 may optionally include a global positioning satellite (GPS) receiver 112 arranged to provide output information to processor 110 indicative of the current geographic location of device 101. This information may, in turn, be used in various ways, in conjunction with the present invention. First, the GPS information may be used in step 307, in selecting the value of $\Delta T$. Specifically, if device 101 is moving quickly, then $\Delta T$ should be relatively small, as compared to its value when the device is moving more slowly. Second, the GPS information may be used in step 309, in conjunction with other information relating to the topology of the boundaries of the different available communications arrangements, to better anticipate the occurrence of a transition in the communications arrangement.

It is to be noted here also that while signal strength was the attribute measured in the preceding example, other attributes could also be used. These include, for example, jitter, noise, distortion and the like.

Figure 4:
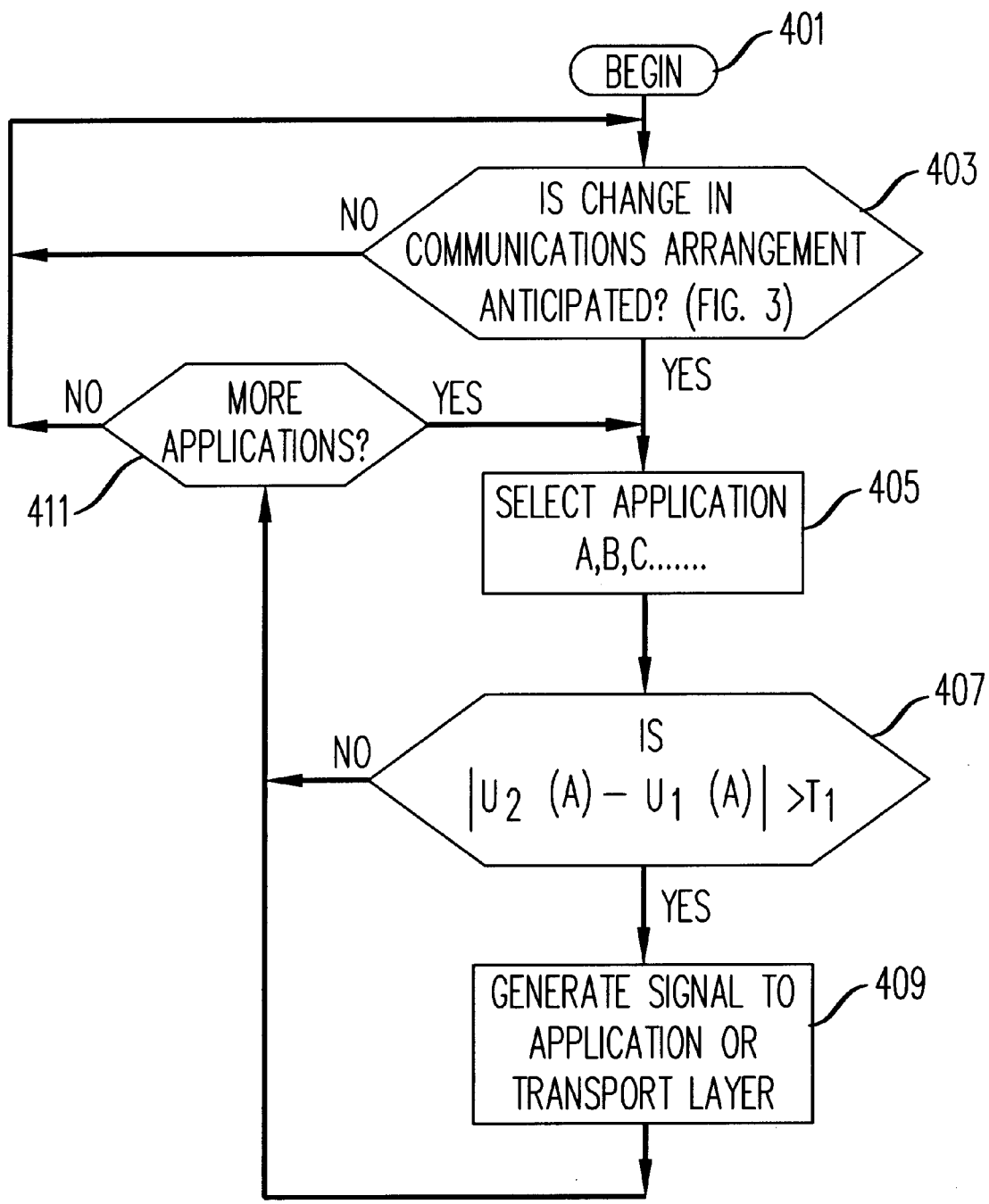
FIG. 4 is a flow diagram illustrating the steps in the process, in accordance with the present invention, by which the application or transport protocol layer in the device is notified in the event that the process of FIG. 3 determines that there is an anticipated change in communications arrangement. This is done so that appropriate changes can be made in one or more transport or application protocol parameters that control operation of the device.

Referring now to FIG. 4, there is shown a flow diagram illustrating the steps in the process, in accordance with the present invention, by which the application or transport protocol layer in the device is notified in the event that the process of FIG. 3 determines that there is an anticipated change in communications arrangement. This is done so that appropriate changes can be made in one or more transport or application protocol parameters that control operation of the device, at a time that is substantially simultaneous with the time that the device transitions from the first communications arrangement to the second communications arrangement.

After the process of FIG. 4 begins in step 401, a determination is made in step 403 as to whether a change in the communication arrangement of the device 101 is anticipated, i.e., whether a signal was generated in step 311 of FIG. 3. If not, the process of FIG. 4 returns to step 401 and repeats, after a suitable delay. If the result in step 403 is positive (YES), a first application $A_1$ currently operating in device 101 is selected, in step 405. For example, if device 101 is a laptop computer, applications could include an Internet web browser, an MPEG audio/video player, or a file transfer application, to name a few. For the selected application, the process continues in step 407, in which a utility function $U(A_1)$ for that application is evaluated, so as to compare the value of $U_1(A_1)$, representing, as explained below, a measure of the overall effectiveness or value of the application, if the application is used in the first communications arrangement, to $U_2(A_1)$, representing a measure of the overall effectiveness or value of the application when the application is used in the second communications arrangement. This comparison may indeed compute the difference between $U_1(A_1)$ and $U_2(A_1)$ and compare the absolute value of the difference to a threshold $T_1$ applicable to that particular application. If it is determined that the absolute value $|U_2(A_1)-U_1(A_1)|>T_1$, this indicates that the effectiveness of the selected application will change significantly when the device transitions from the first to the second communications environment. In that case, a positive (YES) result is obtained in step 407, and the process proceeds to step 409, in which a signal is generated and applied either to transport layer 142 or application layer 141, in order to modify the operation of the device. Since the operation of the processes of FIGS. 3 and 4 can be completed before device 101 actually transitions from the first to the second communications environment, there is enough time to effectuate the modification, which advantageously will occur virtually simultaneously with the transition in communications arrangement.

When a signal is generated in step 409 and applied to the application layer in device 101, various operational changes can be brought about, depending upon the particular application involved. For example, if the application is a video player arranged in accordance with the MPEG standard, the resolution of the player can be adjusted, or the frame rate at which images are processed can be changed. In some circumstances, an additional control signal can be extended in step 409, from the processor 110 in portable device 101 to the remote server 151, in order to effectuate a change in the operation of a corresponding application running on processor 160. In the example just discussed, this could inform the server of the resolution change in the portable device 101, and/or cause the server to treat the application differently.

When a signal is generated in step 409 and applied to the transport layer in device 101, yet other changes can be brought about, again depending upon the particular application involved. For example, if the TCP protocol is being used in connection with Internet communications, the TCP "send window size" or the "receive window size" may be adjusted.

The utility function just described is useful to evaluate a number of factors, such as bandwidth, delay, jitter, loss and cost, that affect the effective operation of a portable device of the type used in connection with the present invention. For example, consider a laptop computer running an Internet browser application that may be communicating with a remote host via either a wireless Wavelan (first communication arrangement) or a wireless GSM system (second communication arrangement). If the bandwidth of the GSM communication arrangement is significantly lower than using the Wavelan, it is advantageous for the browser application to download and display only text, without images. On the other hand, if the laptop is running a facsimile application, the same change in bandwidth might not be significant, since a fax application can operate effectively, in the background, as long as the fax information eventually gets through.

As another example, consider that the user of a cellular telephone is in an area where service may be obtained from two different cellular service providers. The cellular telephone may therefore transition from a first cellular network to a second network as the user moves from place to place. Assume that the cost of connection using the two different communications arrangements is different, and depends upon the amount of data transmitted, rather than the time duration of the call. By comparing the utility (in this example, cost) functions for each communications arrangement, it may be determined that it is advisable to adjust the codec within the cellular telephone to operate with less precision, therefore reducing the amount of data that will be transmitted and consequently reducing the cost of the call.

If it is determined that the effectiveness of the selected application will not change significantly in the second communications environment as compared to the first communications environment, (i.e., if $|U_2(A_1)-U_1(A_1)|<T_1$) a negative (NO) result is obtained in step 407. In that event, a determination is made in step 411 as to whether additional applications running on device 101 require evaluation. If so, the process continues by repeating step 405 for the next application. If not, the result in step 411 is NO, and the process returns to step 401.

The present invention can be modified by persons skilled in the art. Accordingly, the invention is to be limited only by the appended claims.

What is claimed is:

1. A method of operating a portable communication device capable of communicating with a remote server via at least first and second different communication arrangements, comprising the steps of
    monitoring at least one signal indicative of the environment in which said device is operating in order to anticipate a change in the communications arrangement used by said portable communication device to communicate with said remote server,
    if a change is determined in said monitoring step to be both imminent and significant, altering the operation of the portable device by adjusting at least one parameter affecting signals included in the application or transport layer protocol used in said device.

2. The method of claim 1 wherein said portable communication device includes a laptop or palmtop computer, a personal digital assistant (PDA), or a cellular telephone.

3. The method of claim 2 wherein said portable communication device includes a software controlled processor and at least first and second communications interfaces associated with said at least first and second different communication arrangements, respectively, and wherein said monitoring step is performed in the network protocol layer of said processor using signals received from said first and second communications interfaces.

4. The method of claim 1 wherein said portable communication device is arranged to run at least one application, and said altering step includes changing the operation of at least one aspect of said application.

5. The method of claim 1 wherein said portable communication device includes an image display, and wherein said changing steps includes changing the attributes of the image depicted on said image display.

6. A method of operating a portable communication device capable of communicating with a remote server via at least first and second different communication arrangements, comprising the steps of
    monitoring attributes of communications between said device and said remote server to determine the occurrence of significant changes indicating that said device is likely to transition between said first and second different communication arrangements when receiving or transmitting data, and
    responsive to said monitoring step, altering the operation of at least one application operating on said portable communication device substantially simultaneously with said transition between said first and second different communication arrangements.

7. The invention defined in claim 6 wherein said device includes a multilayer protocol stack including at least a network protocol layer and an application protocol layer,
    said monitoring step includes monitoring parameters used in said network protocol layer, and
    said altering steps includes changing parameters used in said application protocol layer.

8. A method of operating a portable communication device communicating with a remote server via a first communication arrangement prior to a transition from said first communication arrangement to a second communication arrangement, comprising the steps of monitoring said device to determine the occurrence of changes in operating characteristics of said portable communication device, and responsive to said monitoring step, altering the operation of said portable communication device by altering at least one parameter controlling an application operating on said device at a time substantially contemporaneous with the time of said transition.

9. A method of managing operation of a portable communication device having a processor controlled by instructions contained in a multilayer protocol stack, said protocol stack including at least an application protocol layer controlling the user level operation of said device and a communication protocol layer controlling the transmission of data to said device and the reception of data by said device, said method comprising the steps of determining the likelihood of the occurrence of changes in the rate at which said portable communication device receives or transmits data to a remote location, and responsive to said determining step, and substantially simultaneously with the occurrence of changes in the rate at which said portable communication device receives or transmits data to a remote location, altering the operation of said portable communication device by altering at least one parameter controlling said application protocol layer.

10. The method defined in claim 9 wherein said device includes a display for pictorial information, and said altering step includes changing the characteristics of the image displayed on said display.

11. The method defined in claim 10 wherein said characteristics include the size or the resolution of said image.

12. The method defined in claim 11 wherein said determining step includes monitoring changes in operation of said communication protocol layer.

13. The method defined in claim 9 wherein said device includes a GPS system, and wherein said determining step includes monitoring changes in the geographic location of said device as a result of signals generated by said GPS system.

14. The method of claim 13 wherein said altering step includes changing the parameters in said application protocol layer.

15. The method of claim 14 wherein said determining step includes monitoring the strength of signals received by or transmitted from said device.

16. A method of operating a portable communication device including a pictorial display capability, comprising the steps of monitoring the strength of signals received in said device via first and second different communications arrangements in order to predict the occurrence of a transition from said first communications arrangement to said second communications arrangement, said first communications arrangements enabling communication between said device and a remote server at a rate different from the rate associated with said second communication arrangement, responsive to said monitoring step, altering the operation of said portable communication device substantially at the time of said transition by altering the manner in which said device presents pictorial data to a user of said device.

17. The method of claim 16 wherein said device is operated under the control of a multilayer protocol stack, and wherein said altering step includes passing a signal from the communication protocol layer to the application protocol layer in said multilayer stack.

18. The method of claim 17 wherein said monitoring step includes monitoring signals at times t and t+∂t, and said method further includes the step of extrapolating from the result of said monitoring, the anticipated signal strength at a future time t+Δt.

19. The method of claim 18 wherein said communications device includes a GPS receiver for providing an output indicative of the speed of movement of said device, and wherein the value of Δt is determined as a function of said GPS receiver output.

* * * * *